United States Patent [19]

Ludwig et al.

[11] Patent Number: 5,021,208

[45] Date of Patent: Jun. 4, 1991

[54] METHOD FOR REMOVAL OF PARAFFIN WAX BASED BINDERS FROM GREEN ARTICLES

[75] Inventors: David C. Ludwig, Towanda; Joseph J. Penkunas, Sayre, both of Pa.

[73] Assignee: GTE Products Corporation, Stamford, Conn.

[21] Appl. No.: 522,616

[22] Filed: May 14, 1990

[51] Int. Cl.$^5$ .............................................. C04B 38/06
[52] U.S. Cl. ..................................... 264/344; 264/63; 419/37; 419/65
[58] Field of Search .................... 264/63, 344; 419/37, 419/65

[56] References Cited

U.S. PATENT DOCUMENTS 4,708,838 11/1987 Bandyopadhyay ................. 264/344
4,713,206 12/1987 Matsuhisa ........................... 264/344

Primary Examiner—James Derrington
Attorney, Agent, or Firm—Robert E. Walter

[57] ABSTRACT

A method for removing a paraffin wax based binder containing a fatty acid from a green article, wherein the article is made of material selected from the group consisting of ceramic powders and metallic powders, which comprises heating the article in a non-oxidizing atmosphere in a furnace by raising the temperature at a rate of about 0.5° C. to 1.0° C. per minute to a first temperature of about 50° C. to 80° C. and thereafter maintaining the first temperature for about 30 to 90 minutes to essentially completely melt the binder, raising the temperature from the first temperature at a rate of about 0.5° C. to 1.0° C. per minute to a second temperature of about 200° C. to 225° C. and thereafter maintaining the second temperature for about 30 to 90 minutes to essentially completely vaporize the paraffin wax, raising the temperature from the second temperature at a rate of about 0.5° C. to 1.0° C. per minute to a third temperature of about 260° C. to 300° C. and thereafter maintaining the third temperature for about 30 to 90 minutes to essentially completely vaporize the fatty acid, and raising the temperature from the third temperature at a rate of about 0.5° C. to 1.0° C. per minute to a fourth temperature of about 430° C. to 480° C. and thereafter maintaining the fourth temperature for about 30 to 90 minutes to insure complete vaporization of essentially all of the binder.

5 Claims, No Drawings

METHOD FOR REMOVAL OF PARAFFIN WAX BASED BINDERS FROM GREEN ARTICLES

BACKGROUND OF THE INVENTION

This invention relates to a method to remove hydrocarbon wax based binders from green articles, especially those made from ceramic powder or tungsten carbide powders. The method makes use of a specific heating schedule which when followed results in the articles having the binder removed without cracking or distortion of the article.

Several unacceptable binder removal techniques are available to the ceramic and powder metal injection molding industries. They usually involve relatively long periods of time, for example, about 2 to 5 days or the use of setter sand (fine grain alumina). They can result in parts cracking and the wax binder being allowed to remain in the part.

It would be very desirable therefore to have a method to completely remove binders from such articles in a reasonably short period of time without cracking or deformation of the articles. The present invention provides such a method.

SUMMARY OF THE INVENTION

In accordance with one aspect of the invention, there is provided a method for removing a paraffin wax based binder containing a fatty acid from a green article, wherein the article is made of material selected from the group consisting of ceramic powders and metallic powders, which comprises heating the article in a non-oxidizing atmosphere in a furnace by raising the temperature at a rate of about 0.5° C. to 1.0° C. per minute to a first temperature of about 50° C. to 80° C. and thereafter maintaining the first temperature for about 30 to 90 minutes to essentially completely melt the binder, raising the temperature from the first temperature at a rate of about 0.5° C. to 1.0° C. per minute to a second temperature of about 200° C. to 225° C. and thereafter maintaining the second temperature for about 30 to 90 minutes to essentially completely vaporize the paraffin wax, raising the temperature from the second temperature at a rate of about 0.5° C. to 1.0° C. per minute to a third temperature of about 260° C. to 300° C. and thereafter maintaining the third temperature for about 30 to 90 minutes to essentially completely vaporize the fatty acid, and raising the temperature from the third temperature at a rate of about 0.5° C. to 1.0° C. per minute to a fourth temperature of about 430° C. to 480° C. and thereafter maintaining the fourth temperature for about 30 to 90 minutes to insure complete vaporization of essentially all of the binder.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention provides a method to essentially completely remove paraffin wax based binders containing a fatty acid component from green articles. The method makes use of a specific heating schedule which when followed according to the present invention results in complete removal of the binder without cracking or distortion of the article.

The articles from which the binder is to be removed are green articles made of sinterable powders such as ceramic powders and metallic powders such as metal powders, metal alloys, metal carbides, nitrides, borides. The powders are usually fine powders, that is they have a mean diameter of less than about 10 micrometers.

The ceramic materials which are best suited to the practice of the present invention although the invention is not limited to these are finely divided sinterable materials such as silicon nitride powder. The silicon nitride is ball milled with sintering aid powders such as yttria and alumina.

The metallic materials that are best suited to the practice of the present invention although the invention is not limited to these are rapidly solidified powders, milled powders, or spray dried powders. Some preferred materials are tungsten carbide especially tungsten carbide containing cobalt, tungsten alloys, and maraging steels (Fe, Co, Ni, and Mo). One typical type of material is tungsten carbide containing cobalt which is prepared by standard milling and spray drying methods.

The binder is a paraffin wax based binder made up of paraffin wax and a fatty acid. Other components can be present in the binder such as esters and epoxies. Some preferred types of paraffin wax are supplied by Astor Chemical Co. under the designation 1865Q, by Fisher Chemical Co. under the designation P-21, by Roger Reed Co. having a melting point of about 125° F. to about 165° F. by Shell Oil Co. designated as Shell wax 120, and by Amoco Oil Co. designated as Parawax. The fatty acid can be any type generally. The preferred fatty acids are oleic acid, stearic acid, and combinations of these. The fatty acid content serves as a surfactant and aids in producing a uniform intimate mixture of the powder and binder.

The powder is mixed with the binder. The binder content in the powder-binder mixture is about 2.8% to about 4.5% by weight of the mixture with about 3.3% to about 3.8% by weight being preferred. The binder itself is made up of about 6% to about 14% by weight of a fatty acid with about 9% to about 11% by weight being preferred.

The articles can be of any shape and can be formed by any conventional forming technique. One such technique is injection molding of the material and binder mixture. The binder makes up about 35% to about 55% by volume of the article.

Once the green article is formed, the binder is removed according to a method that makes use of the phase transition temperatures, that is the melting and vaporization points of the components of the binder. At room temperature the furnace is slowly ramped to the lowest transition temperature at which it is held for a set period of time. This procedure allows the phase transformation to occur slowly, giving minimum physical distortion to the article. The furnace is then ramped slowly to the next transition temperature at which it is again held for a set period of time. This ramping and holding cycle is repeated until the temperature is above the last transition temperature and all the organic binder components are in a vapor phase. Care must be taken that the ramping be slow to at least about 450° C. If temperatures higher than about 450° C. are required, the ramping can be faster. Details of the preferred embodiments of this procedure are given below.

The article is heated in a non-oxidizing atmosphere in a furnace. The atmosphere can be a vacuum, hydrogen, dissociated ammonia, or a mixture of nitrogen and hydrogen.

The temperature in the furnace is raised at a rate of about 0.5° C. to about 1.0° C. per minute until a first temperature of about 50° C. to about 80° C. is reached. The furnace is maintained at this first temperature for about 30 to about 90 minutes to essentially completely melt the binder.

The temperature in the furnace is then raised from the first temperature at a rate of about 0.5° C. to about 1.0° C. per minute to a second temperature of about 200° C. to about 225° C. This second temperature is maintained for about 30 to about 90 minutes to essentially completely vaporize the paraffin wax.

The temperature in the furnace is then raised from the second temperature at a rate of about 0.5° C. to about 1.0° C. per minute to a third temperature of about 260° C. to about 300° C. This third temperature is maintained for about 30 to about 90 minutes to essentially completely vaporize the fatty acid.

The temperature in the furnace is then raised from the third temperature at a rate of about 0.5° C. to about 1.0° C. per minute to a fourth temperature of about 430° C. to about 480° C. The fourth temperature is maintained for about 30 to about 90 minutes to insure complete vaporization of essentially all of the binder.

With ceramic materials generally the time at each of the temperatures is about 60 to about 90 minutes. With tungsten carbide, the time is about 30 to 60 minutes.

To more fully illustrate this invention, the following non-limiting example is presented.

EXAMPLE

The following heating schedule is carried out to completely remove the binder from silicon nitride or tungsten carbide articles formed by injection molding. The articles are made from powder consisting essentially of about 1% by weight oleic acid, about 2% by weight paraffin with the balance being the powder.

| Ramp Rate °C./Min. | To °C. | Atmosphere | Transition |
|---|---|---|---|
| 0.5 | 65 | $H_2$ | Melting point of binder |
| Hold for about 30-60 minutes for complete melting of binder. | | | |
| 0.5 | 215 | $H_2$ | Vaporization of paraffin |
| Hold for about 30-60 minutes for complete vaporization of paraffin. | | | |
| 0.5 | 280 | $H_2$ | Vaporization of fatty acid |
| Hold for about 30-60 for complete vaporizaton of fatty acid. | | | |
| 0.5 | 450 | $H_2$ | Final transition |
| Hold for complete and final vaporization of all binder components. | | | |

The temperature is then ramped to desired sintering temperature at the desired rate.

The advantages of the binder removal method of the present invention are that the binder is removed without physical damage while the entire binder removal operation and sintering cycle can be run in less than 1 day.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing a paraffin wax based binder containing a fatty acid from a green article, said method comprising:
   (a) heating said article wherein said article is made of material selected from the group consisting of ceramic powders and metallic powders, in a non-oxidizing atmosphere in a furnace by raising the temperature in said furnace at a rate of about 0.5° C. per minute to about 1.0° C. per minute to a first temperature of about 50° C. to about 80° C. and thereafter maintaining said first temperature for about 30 to about 90 minutes to essentially completely melt said binder;
   (b) raising the temperature in said furnace from said first temperature at a rate of about 0.5° C. per minute to about 1.0° C. per minute to a second temperature of about 200° C. to about 225° C. and thereafter maintaining said second temperature for about 30 to about 90 minutes to essentially completely vaporize said paraffin wax;
   (c) raising the temperature in said furnace from said second temperature at a rate of about 0.5° C. per minute to about 1.0° C. per minute to a third temperature of about 260° C. to about 300° C. and thereafter maintaining said third temperature for about 30 to about 90 minutes to essentially completely vaporize said fatty acid; and
   (d) raising the temperature in said furnace from said third temperature at a rate of about 0.5° C. to about 1.0° C. per minute to a fourth temperature of about 430° C. to about 480° C. and thereafter maintaining said fourth temperature for about 30 to about 90 minutes to insure complete vaporization of essentially all of said binder.

2. A method of claim 1 wherein said article is made of material selected from the group consisting of ceramic powders and tungsten carbide powders.

3. A method of claim 1 wherein said binder makes up about 35% to about 55% by volume of said article.

4. A method of claim 1 wherein said fatty acid is selected from the group consisting of stearic acid, oleic acid and combinations thereof.

5. A method of claim 1 wherein said heating is done in an atmosphere selected from the group consisting of vacuum, hydrogen, dissociated ammonia, and a mixture of nitrogen and hydrogen.

* * * * *